CONCAVE-SURFACED VACUUM CONTROLLED AIR FILM

Filed Jan. 10, 1966

INVENTORS
RAYMOND A. BARBEAU
KELLY B. DAY, JR.
JAMES A. WEIDENHAMMER
BY Bernard M. Goldman
ATTORNEY United States Patent Office 3,420,424
Patented Jan. 7, 1969

3,420,424
CONCAVE-SURFACED VACUUM CONTROLLED AIR FILM

Raymond A. Barbeau, Kelly B. Day, Jr., and James A. Weidenhammer, Poughkeepsie, N.Y., assignors to International Business Machines Corporation, Armonk, N.Y., a corporation of New York
Filed Jan. 10, 1966, Ser. No. 519,570
U.S. Cl. 226—97 18 Claims
Int. Cl. B65h 17/32

ABSTRACT OF THE DISCLOSURE

A precise spacing is maintained between a moving web and a smooth concave surface containing a transducer by providing a vacuum port at a leading portion of the concave surface.

This invention relates generally to precise spacing control and tracking registration between a continuously-smooth concave-surfaced area and a relatively moving flexible web. The concave-surfaced area can include a flux transducer having a relatively moving relationship with a recording surface on the web, which may have an electrostatic or an electromagnetic relationship with the transducer.

Prior devices have used magnetic heads in moving relation to a magnetic tape, and they have utilized a hydrodynamic laminar air boundary to lubricate and thereby reduce the frictional engagement between the two surfaces. The relatively moving surfaces carry air molecules between them to create a lubricating air film causing the two surfaces to be spaced by a distance dependent upon a number of variables such as the relative velocity between the surfaces, the force between them, the coefficient of friction of the surfaces, the radius of curvature about the magnetic head, and other factors.

Also, blowing air between the surfaces has often been used to control the spacing relationship between a web and a magnetic transducer.

In neither the hydrodynamic nor the blowing air techniques is the spacing between the relatively moving web and transducer surface controlled to the degree necessary for practical usability with the high density recording techniques found in today's magnetic recording apparatus involving bit densities in excess of 1000 bits per inch.

This invention relates generally to a discovered species within the technique described and claimed in a U.S. Patent 3,327,916 issued on June 27, 1967, and titled "Vacuum Controlled Air Film" by inventors R. A. Barbeau, D. K. Close, K. B. Day, Jr., E. J. Wroblewski and J. A. Weidenhammer, which is assigned to the same assignee as the subject application.

It is therefore the primary object of this invention to provide gas lubrication control between a relatively moving web and a continuously-smooth concave surface for precisely controlling a stable spacing (such as within ±10 millionths of an inch of a required spacing $h^*$) over a selected area of the concave element during the course of relative movement.

It is another object of this invention to provide air lubrication control for maintaining a precise spacing between a relatively moving web and a continuously-smooth concave-rigid surface, in which the web is rotated relative to the concave surface which is preceded by vacuum ports formed through a preceding portion of the otherwise continuously-smooth surface.

It is still another object of this invention to provide an air vacuum lubrication arrangement between a relatively moving web and a continuously-smooth concave surface to obtain precise spacing control between the web and a selected area of the concave surface to enable very high density flux communication between them.

It is a further object of this invention to provide pneumatic lateral registration means for a strip being supported pneumatically on a drum.

It is still another object of this invention to provide a rotating drum surface having a lateral-alignment shoulder at least along one side for controlling lateral registration of a web, and means for pneumatically maintaining said registration during rotation of said drum by differential lateral pneumatic pressures.

It is another object of this invention to provide lateral registration for a flexible web against a shoulder on a pneumatic supporting surface for the web by utilizing a source of blowing pneumatic-pressure differential laterally of the moving web, with the greatest pneumatic pressure being applied to the web portion adjacent the shoulder.

It is another object of this invention to provide lateral registration for a strip being pneumatically maintained on the surface of a rotating drum having a lateral registration shoulder at least on one side, distributed blowing air jets having a blowing pressure differential that increases toward the shoulder for pneumatically creating pressures on said strip causing it to be maintained in lateral registration with said shoulder during drum rotation.

In order to accomplish the objects of this invention, a controlled-spaced area is provided with a smooth-concave surface (which may be a sector of a cylinder). The smooth-concave surface comprises a concave controlled-spaced area which is only interrupted on its leading side by a plurality of pneumatic vacuum openings. No other surface discontinuities or interruptions exist in the controlled-spaced area, which, for example, is smooth to approximately 20 millionths of an inch for required magnetic web processing operations. Any interruption in the surface following the vacuum openings terminates the controlled-spaced area. The controlled-spaced area may have a transducer smoothly embedded in its surface contour, not interfering with its smoothness tolerance. A relatively moving web is supported adjacent to the controlled-spaced area and the web is moved in the direction from the slots to the controlled-spaced area along the concave surface during relative movement to obtain close flux communication between the web and transducer. The inter-relation between the smoothness on the surface of the concave controlled-spaced area and the adjacent surface of the moving web is: the sum of the actual smoothness limits on both surfaces is approximately one-half the spacing ($h^*$) between the two surfaces.

In an example of obtaining relative motion, the web may be pneumatically held against the surface of a rotating drum by either a vacuum force operating from within certain sectors of the drum, or by blowing air ejected externally against said strip to force it against the drum surface.

During the relative motion, the strip is maintained in lateral registration with a shoulder on a web supporting surface by having unbalanced pneumatic blowing pressures laterally positioned with respect to the relatively moving strip. The pressures of blowing air increase toward the side of lateral registration.

The foregoing and other objects, features and advantages of the invention will be apparent from the following more particular description of the preferred embodiments of the invention, as illustrated in the accompanying drawings.

In the preferred mode of invention, it is used to write or read magnetic information on or from a flexible magnetic surfaced strip 10, which for example might be a web of Mylar (DuPont trademark), or other plastic, perhaps 12 inches long by 3 inches wide. A magnetic surface is provided at least on one side of strip 10, such as by a coat of magnetic particles or by plating thereon.

Figure 1:
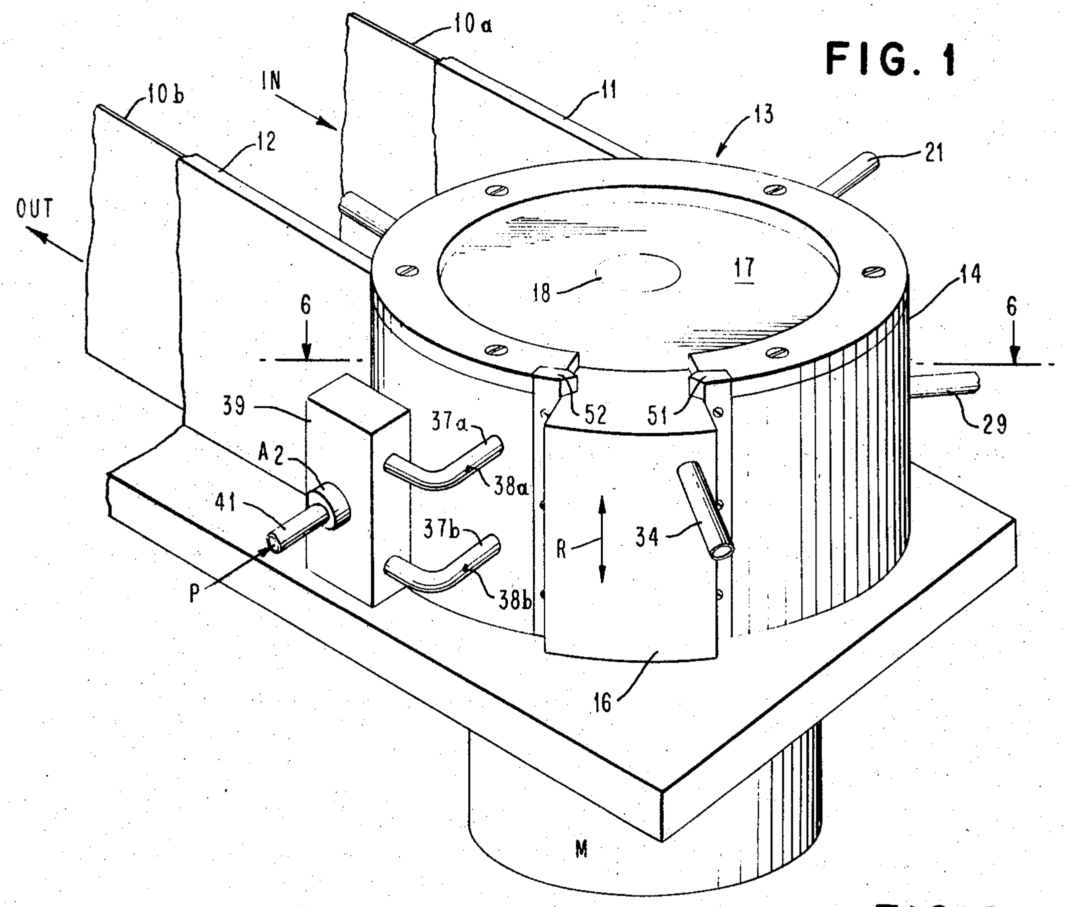
FIG. 1 illustrates a perspective view of one embodiment of the invention.

Strips 10 are accessed and fed to the illustrated embodiments of this invention by means (not shown) which is not part of this invention. In FIG. 1, the strip 10 is provided to an input position 10*a* where it is received by a chute 11. After strip 10 is processed, it is fed out of the processing station through exit chute 12 along strip position 10*b*. In the same manner in FIG. 8, a strip enters at slot 113 and exits at slot 114. It is permissible to have one strip 10*a* waiting to be processed, a second strip 10 being processed, and a third strip 10*b* which has been processed and is awaiting removal. Thus both described embodiments are concerned with the handling of a strip after it has been released from chute 11 or 113 and includes the mechanical handling of the strip through its release to the exit chute 12 or 114.

Figures 2, 3:
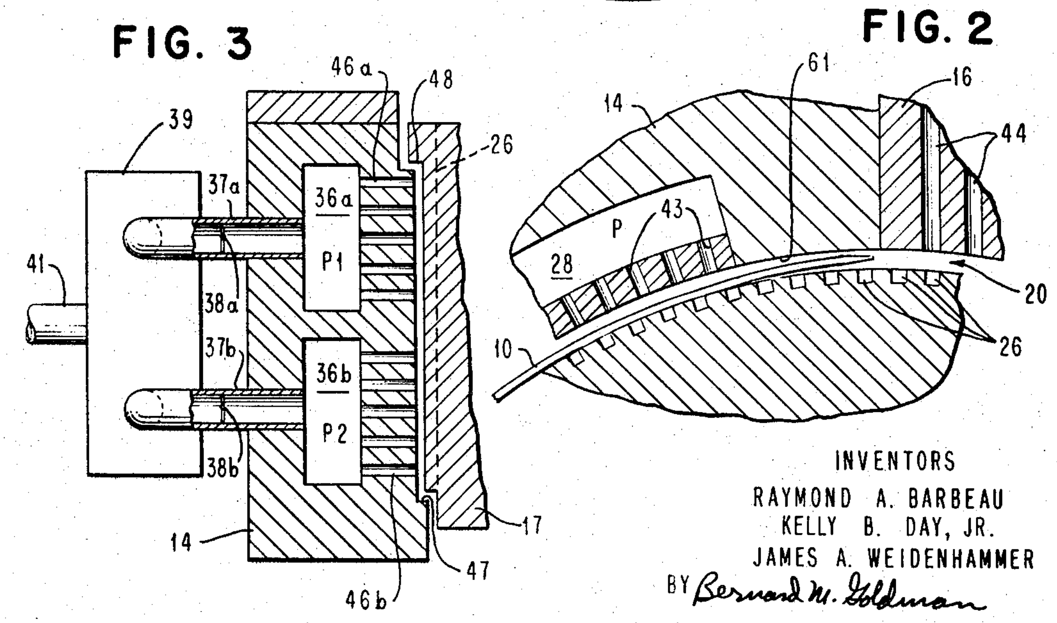
FIG. 2 shows a portion of the sectional view in FIG. 6 with a strip about to enter the controlled area.
FIG. 3 illustrates a partial section view along section 3—3 in FIG. 6.
Figures 4, 5, 6:
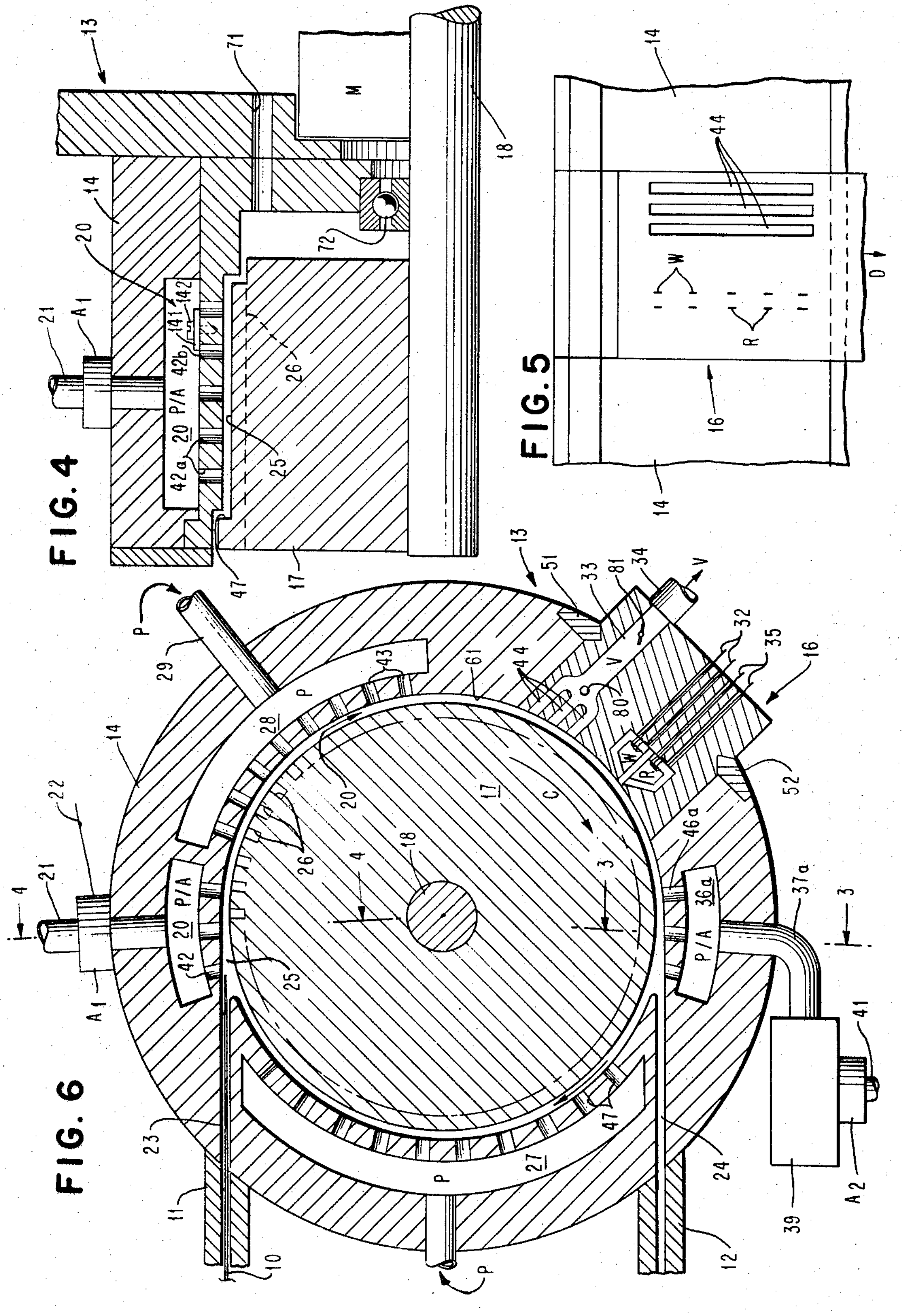
FIG. 4 illustrates section 4—4 in FIG. 6.
FIG. 5 illustrates a bottom view of a "controlled-spaced area" having electromagnetic transducers and vacuum slots leading said controlled area.
FIG. 6 illustrates section 6—6 in FIG. 1.
Figures 7, 8:
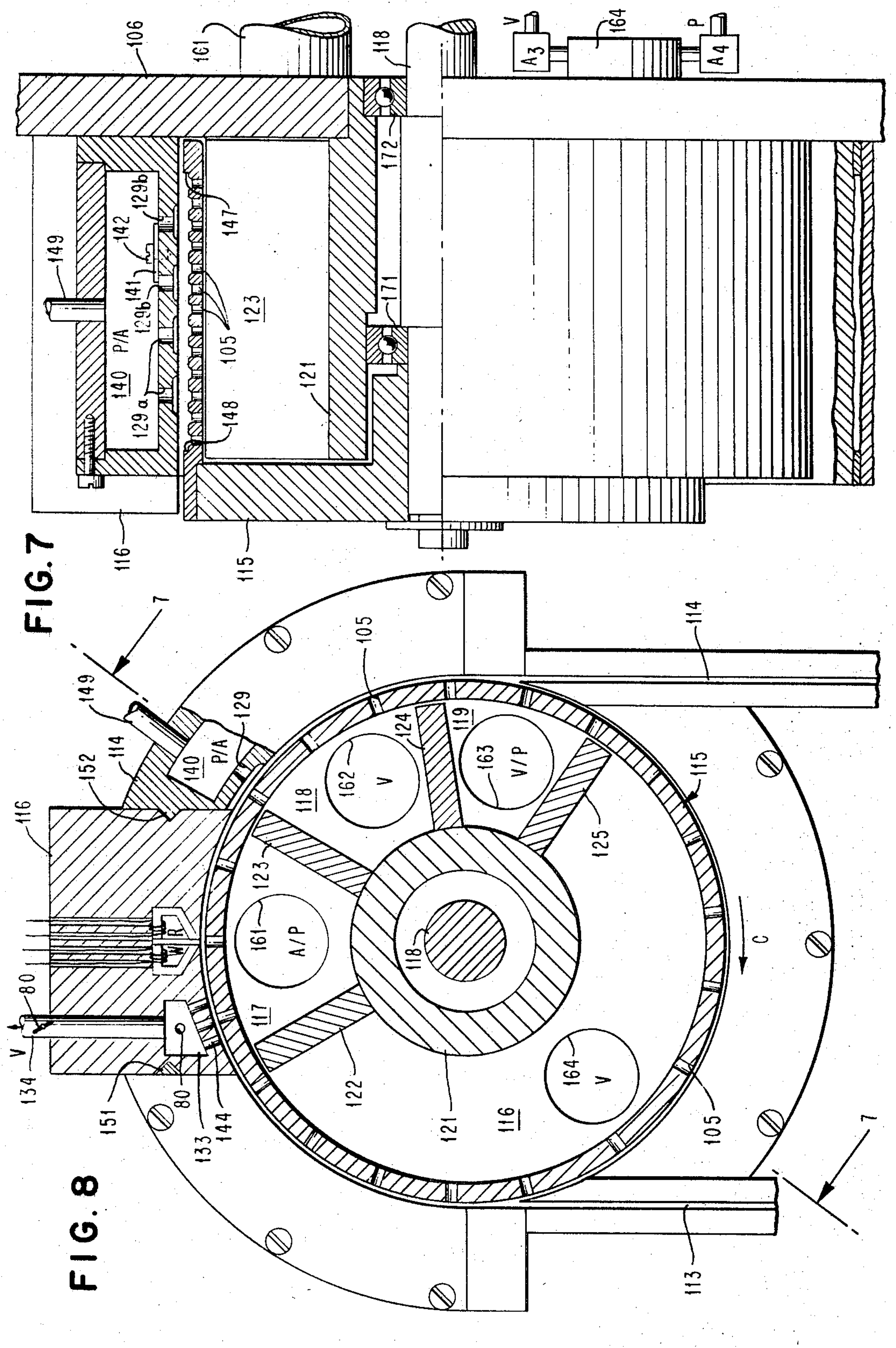
FIG. 7 illustrates partial section 7—7 in FIG. 8.
FIG. 8 represents another embodiment of the invention.

A strip begins a processing cycle when its leading end engages a drum 17 fixed on a rotating shaft 18 in FIGS. 1, 4 or 8. Drum 17 is surrounded by a shroud 14 which contains pneumatic chambers and supports a transducer assembly 16, which in the embodiment can be laterally located at plural positions in the direction of arrow R in FIG. 1 by track positioning means known in the art (not shown). The internal construction of drum 17 and shroud 14 is represented in more detail in the sectional view of FIG. 6. Input chute 11 is formed with a slot therein directly connecting to slot 23 within shruod 14. Slot 23 is tangential with the opening 25 between drum 17 and shroud 14, for receiving a strip 10 therein. As the strip enters tangentially into the chamber, it moves to the drum surface past deactivated ports 42 (exerting atmospheric pressure by having a valve $A_1$ closed) until it is met by jets of air blowing from ports 43 that force the web quickly toward the drum surface. Ports 43 are connected to chamber 28 that receives pressurized air through tube 29 from a pressure source not shown. The web is quickly blown into firm frictional adherence to the surface of drum 17 due to the plurality of grooves 26 formed in the drum surface, for the purpose of quickly exhausting any air film between the web and the drum surface which might interfere with the immediate adherence to the web to the drum surface periphery. Thus as soon as frictional contact is made between the back of strip 10 and drum 17 because of the blowing air from ports 43, the web immediately starts to move at the drum angular velocity as the web adheres to the drum surface. After leaving the last port 43, the web surface no longer is held against the drum surface; and centrifugal force tends to move the web off the drum surface toward the stationary shroud surface 61. FIG. 2 illustrates strip 10 as its leading edge is leaving ports 43 and just before it is receiving by vacuum ports 44, as it leaves the drum surface. A substantial air film boundary is created by the blowing air from jets 43 which maintains strip 10 with a spacing from surface 61 for in excess of the maximum permissible spacing between a recording surface and a transducer required to operate at a high bit density, such as in excess of 1000 bits per inch.

As the web area reaches the concave surface of movable head assembly 16, this spacing is reduced in a precisely-controllable manner by a plurality of vacuum slots 44 which connect in common to a tube 34 that receives vacuum from a stable vacuum source (not shown) which may be of the conventional type. Accordingly, as the web passes the write and read heads, it is precisely spaced from thehead gaps by an amount $h^*$ which for example may be 50 millionths of an inch with a tolerance of $\pm 5$ millionths of an inch. A plurality of dual-gap magnetic transducers of conventional type having write and read gaps flush with the head surface are used; and they are located in the concave surface without interrupting the smoothness of that surface. The heads as well as the slots 44 are contained in the lateral movable head assembly 16 which is laterally slideable on tracks provided by projections 51 and 52, fixed to shroud 14 to support head assembly 16. The smoothness of the concave contour of the inner side of head assembly 16 should be maintained to an order of a few millionths of an inch with only the openings for ports 44 interrupting that surface as shown in FIG. 5, which represents a view of the concave side of head assembly 16. The head gaps are shown in a read and write head-gap set for each recorded track for operation in the conventional manner of writing and/or reading information on magnetic tape. The write/read head-gap sets are laterally spaced across the head assembly for operating simultaneously with a plurality of tracks. The head can be incremented laterally to other tracks on a strip by means known in the art and not part of this invention. Thus, a plurality of lateral positions may be provided for operating with a large number of tracks on a single strip, such as 256 on a 3 inch wide strip.

The remaining inner surface of shroud 14, other than for head assembly 16, need not have the smoothness tolerances required for the concave surface of head assembly 16.

By the time the leading edge of strip 10 is carried beyond head assembly 16, a decision must be made whether the strip is to exit to chute 12, or to be maintained on the drum surface for the next cycle. This decision is made by means not part of this invention (such as a computer program according to whether additional processing remains to be done on the same strip). If the decision is made to exit the strip, atmospheric pressure is maintained at a plurality of ports 46 connected to a chamber 36 by closing a valve $A_2$, in which case the centrifugal forces on the strip cause it to spin off of the drum and enter tangential exit slot 24.

On the other hand, if a decision is made to recycle the strip, valve $A_2$ is opened so that air under pressure from tube 41 is injected into chamber 39; and thereby blowing air exits from openings 46 to counteract the centrifugal force and push the leading edge of the strip against the surface of drum 17, so that the strip is maintained on the drum surface and cannot enter slot 24. When the strip moves beyond slot 24, it receives blowing air from orifices 47 which maintains the strip against the drum surface. Orifices 47 connect the chamber 27 which receives pressurized air through tube 29. Thereafter the strip is carried past ports 42 which also eject blowing air because the decision to recycle the strip causes valve $A_1$ to be opened, and pressurized air from tube 21 enters chamber 20 and emits air against the strip from openings 42. Thereafter, for the remainder of the second cycle, the operation of the pneumatic actuations is the same as previously described for the first cycle regarding pressurized opening 43, and head assembly 16. However, before the strip reaches ports 46 during each cycle, another decision must be made as to whether the strip must again be recycled or exited through slot 24, which decision is executed by opening or not opening valves $A_2$ and $A_1$ to cause recycling or exiting respectively.

A plurality of openings 71 are provided about the radial wall supporting shroud 14 to assist the exhausting of air from the blowing jets to prevent undesirable pressure build-up over the drum surface.

Another important feature of this invention is the means used to obtain and/or maintain the lateral registration of a strip during its cycling operations. This is done by controlling the placement of blowing air applied to the strip while the web is raised above the drum surface. For example after the strip leaves head assembly 16, it is off the drum surface. As the leading edge of the web passes beneath ports 46*a* and 46*b*, they are arranged so that the front corner of the strip next to shoulder is first blown against the drum surface before the opposite leading corner is blown against the drum surface. The first downward movement by the adjacent (to the shoulder) corner to the drum at first causes that corner to be positioned more distant from the shoulder. But this causes a skew to the edge of the web adjacent to the shoulder angled backwardly toward the shoulder behind the front edge of the strip. This causes the following portion of the strip to be moved toward shoulder 47 as the strip is being rotated. In this embodiment, the initial downward movement of the adjacent front corner of the strip is done by causing more blowing air pressure on the adjacent front corner than on the opposite front corner which is done by making the pressure $P_1$ in chamber 36*a* (adjacent shoulder 48) greater than the pressure $P_2$ in chamber 36*b* by adjusting respective butterfly valves 38*a* and 38*b* in tubes 37*a* and 37*b* so that valve 38*a* is open more than 38*b*.

In summary, it has been discovered that this unbalanced pressure arrangement causes the web not only to adhere to the drum surface, but causes the strip to be laterally moved to shoulder 47 if it is not already in contact with shoulder 47. This technique can be in principle applied by any means which causes the adjacent front corner to move downward before the other front corner. Hence, it can be done by having all jets 46 equal except for placing the adjacent (to the shoulder) blowing air jet 46 out-of-lateral alignment with the other jets, so that it is reached by the front adjacent corner of the strip just before the other front corner reaches its first blowing jet 46. Also the differential pressure arrangement between laterally aligned ports may be done in any number of ways, also including making the ports different diameters (the port closest to the shoulder would then have a greater diameter than the ports distant from the shoulder).

FIG. 4 illustrates a section 4—4 through FIG. 6, illustrating how the drum may be supported in a cantilevered fashion on shaft 18. FIG. 4 also illustrates the section through chamber 20 which shows the openings 42*b* being partly blocked by an adjustable cover plate to unbalance the blowing pressures to enhance the lateral registration feature in the manner explained above.

A second embodiment of the invention is shown in FIGS. 7 and 8 which includes a head arrangement 116 that is basically the same as head arrangement 16 shown in FIG. 6 for the first embodiment. The primary difference between the two embodiments is in the means for maintaining the strip on the revolving drum. In FIG. 8, drum-internal vacuum techniques are utilized for maintaining the strip on the drum; while in FIG. 6 drum external pressure techniques are utilized in the first embodiment. In FIG. 8, the input chute 113 and output chute 114 are basically the same as input chute 13 and output chute 14, respectively found in FIG. 6 for the first embodiment.

In FIG. 8, a revolving drum 115 is provided having vacuum applied from certain internal sectors to maintain the strip on the drum at the required angular positions. Thus the construction of the drum in FIG. 7 shows the drum surface fixed to shaft 118. The drum is revolved at a constant speed (such as 1800 revolutions per minute) by a motor (not shown) connected to shaft 118 in the same manner as is shown in FIG. 1 to revolve drum 17 at the same angular velocity, for example.

Drum 115 has formed therethrough a plurality of ports 105 about its entire circumference and laterally across the drum surface between its opposite shoulders 147 and 148, between which the strip is received on the drum surface. The ports 105 communicate the pressures in the stationary sectors within the drum to the moving drum surface.

The pressure arrangement within the drum is obtained by a plurality of stationary sector barriers 122, 123, 124 and 125 fixed to a stationary concentric support 121 that is fastened to a plate 106 to which shroud 116 is fastened as well. Bearings 171 and 172 are provided between the inner surface of support 121 and shaft 118 for supporting revolving shaft 118 and drum 115.

Accordingly, the inner portion of the drum is divided up into a plurality of stationary pneumatic-pressure sectors 116, 117, 118 and 119.

A pressure-input opening 161, 162, 163 or 164 is provided to each sector within the drum for conveying a predetermined pneumatic pressure through a respective tube. Thus, for example, tube 164 connects a vacuum source to sector 116. Likewise, tube 161 connects sector 117 either to atmospheric pressure or to an above-atmospheric pressure source. No valving is needed for tube 161. In a similar manner tube 162 connects sector 118 to the same vacuum source supplying sub-atmospheric pressure to tube 164. However, sector 119 is connected to a tube 163 through a valve arrangement which can very quickly connect either vacuum or pressure to sector 119 as a function of whether strip 10 is to be maintained on the drum for the next cycle or is to be excited through chute 114.

Thus as strip 10 enters through chute 113, it is received against revolving drum 115 by the vacuum in sector 116. As the strip is moved clockwise by drum rotation, the drum ports beneath each area of the strip leave sector 116 and enter sector 117 which switches the pressure underneath the strip area from vacuum (V) to either atmospheric pressure (A) or above atmospheric pressure (P). Accordingly, when the ports beneath the web reach sector 117, the strip leaves the drum surface under centrifugal force. Then the strip moves to the concave surface of head assembly 116, but it cannot engage the concave surface due to the large laminar air boundary created therebetween by the relative movement. However, the large laminar air boundary is immediately reduced to a precise small spacing over the controlled-spaced area at the head gap by virtue of the operation of vacuum ports 144 that connect to chamber 133 having a vacuum source connected thereto. After the web surface leaves the smooth concave contour of head assembly 116, it passes beneath a plurality of ports 129 which are connected to a chamber 140 that receives either atmospheric pressure or above atmospheric pressure through a tube 149. The purpose of ports 129 is to permit air to easily reach the outer side of strip 10 so that it can be quickly drawn to the surface of the drum by the vacuum existing in sector 118.

The ports 129 may operate with a lateral differential pressure as explained for ports 46*a* and 46*b* in the first embodiment (FIG. 6) to cause the web to be brought into lateral registration with one of the shoulders 147 or 148 formed on the drum. This may be done by restricting the air pressure through some of ports 129, such as through 129*b* to obtain lateral registration with shoulder 148; such as by providing an adjustable rectangular plate 141 adjustably pivotable upon a screw 142 which can be moved to partially block the openings in ports 129*b* and thereby reduce the pressure of the blowing air exiting from ports 129*b* against the web surface.

Before the leading edge of the strip leaves sector 118, a decision must be made as to whether strip 10 should continue to be revolved for the next revolution of the drum, or whether the strip should be exited through chute 114. This decision is made in precisely the same manner as described for the first embodiment. The decision is executed by actuating either valve $A_3$ to connect a vacuum source to chamber 119, or by instead actuating a valve $A_4$ to connect a pressure source to sector 119. If the vacuum source is connected to sector 119, the strip is maintained on the drum so that it can cycle for the next revolution. On the other hand, if the pressure source is connected to sector 119, the strip is forced off the drum so that it is caused to enter exit chute 114 and thereby terminates its processing on the drum.

In both of the described embodiments, the length of the strip is preferably less than the circumference of the drum so that it can be recycled when required. If the strip is longer than the circumference of the drum, it must be exited immediately upon engaging exit chute 114, in which case any length of strip may be processed by the read/write assembly 16 or 116. In the long strip case, it is necessary for the external means (not part of this invention) to reposition the strip at the entrance chute 11 or 113 if recycling is necessary.

The controlled-spaced means in this invention only includes the rigid surface required for obtaining the precisely controlled surface-to-web spacing operation. The smooth-concave surface comprising the controlled-spaced means extends only for a fraction of the 360° about either drum. The limits of the smooth-concave surface need extend only for a short distance (for example, not more than one-half inch) before the first slot 23 (away from the controlled-area) and through the controlled-spaced area that includes the head gaps. This smooth concave surface for the controlled-spaced area must be smooth to approximately 20 millionths of an inch, which distinguishes it from the remainder of the inner shroud surface which need not be smooth to within this tolerance. The precise amount of smoothness tolerance required for the surface of the controlled-spaced area is inter-related with the smoothness on the web surface facing it. The inter-relationship is that the sum of the actual smoothness tolerances on both the controlled-spaced area and the facing web surface is equal to one-half of the spacing ($h^*$) between them required to be controlled by the vacuum ports. The concave surface of the controlled area on assembly 16 in both embodiments extends only for about 30° of a circular sector.

The vacuum at the slots 44 and 144 is stabilized by having an opening 80 through vacuum chamber 33 or 133 connecting directly to the atmosphere and having a butterfly valve 81. Opening 80 acts as a pneumatic shunt path following a series pneumatic resistance path obtained by adjusting butterfly valve 81.

Either embodiment in this disclosure can also be used for operation with standard elongated tape, wherein the tape passes directly from the entrance chute to the exit chute as it is processed by the write and/or read heads on assembly 16 or 116.

This application is related to patent application for U.S. Serial No. 519,788, filed January 10, 1966, by R. A. Barbeau, J. A. Weidenhammer and E. J. Wroblewski, assigned to the same assignee as the subject application.

Each of the valves $A_1$ and $A_2$ may be constructed as the "High Speed Valve" disclosed in page 40 of the October 1963 issue of the IBM Technical Disclosure Bulletin.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A controlled concave air-bearing means comprising
a member having a concave surface formed with a smooth contour,
a controlled spaced area,
transducer means contained in said controlled-spaced area without interrupting said smooth contour at, between, and adjacent to said transducer means to an order of millionths of an inch,
at least one vacuum port formed through a leading portion of said smooth concave surface prior to said transducer means,
said controlled-spaced area existing on said concave surface behind said vacuum port,
and said vacuum port enabling said strip to move over the concave contour of said controlled-spaced area with a precisely stable and controlled spacing therefrom while vacuum is being applied to said port during relative strip movement.

2. A controlled concave air-bearing means as defined in claim 1 in which a plurality of vacuum ports is formed through the leading portion of said concave surface, said vacuum ports having a combined width at least equal to the width of said controlled-spaced area,
and said controlled-spaced area extending behind said vacuum ports until the first interruption in said smooth concave surface.

3. A means as defined in claim 1 including,
a rotatable surface for supporting said flexible web,
said rotatable surface being movable in relation to said concave surface in a direction to move said web from said port to said controlled-spaced area.

4. Concave air-bearing means as defined in claim 3 in which said web supporting means comprises
a drum rotatable relative to said controlled-spaced area to move said web from said port to said controlled-spaced area,
a processing chamber surrounding said drum,
and means for frictionally engaging a portion of said flexible web with said drum to impart relative motion to said web.

5. Concave air bearing means as defined in claim 4 in which
said frictional engaging means further comprises a drum having grooves formed in its surface,
and said processing chamber includes a shroud supported about said drum for applying blowing air toward the surface of said drum before said controlled-spaced area.

6. Concave air-bearing means as defined in claim 5 in which said shroud further includes,
means for selectively applying blowing air toward the surface of said drum after said controlled-spaced area for continuing the recycling of said web over said controlled-spaced area.

7. Concave air-bearing means as defined in claim 4 in which said frictional engaging means further comprises
at least one stationary vacuum sector formed within said rotatable drum for applying vacuum to its surface before said controlled-spaced area.

8. Spacing control means as defined in claim 4 for handling said web, said processing chamber further including
an entrance and an exit formed in said processing means for respectively receiving and exiting a web,
and controlled-air pressure means prior to said exit for controlling the exiting of said web from said processing chamber.

9. Spacing control means as defined in claim 8 further including
a controlled blowing air source positioned prior to said exit to blow air toward said drum,
and means for actuating said controlled blowing air source to control recycling of said web on said drum.

10. A controlled concave air-bearing means as defined in claim 8 further including
a sector within said drum located angularly between said concave controlled-spaced area and said exit,
and said drum having a plurality of openings formed through its surface to communicate the internal pressures within said sector to a web supported about the drum surface, and means for switching the pneumatic pressure within said sector to control the exiting and recycling of said web.

11. Spacing control means as defined in claim 10 in which said means for switching controls the choice of atmospheric and below atmospheric pressures within said sector to control the exiting and recycling of said strip on said drum.

12. Lateral registration control means for a flexible strip comprising means for conveying a strip, a lateral registration shoulder formed at least along one edge of said strip conveying means, pneumatic means for holding said strip against at least a portion of said conveying means, means for lifting said strip from said conveying means during relative movement of said strip, and pneumatic registration control means following said lifting means for depressing the side of said web adjacent said lateral registration shoulder before depressing the opposite side of the web.

13. Lateral registration means as defined in claim 12 in which said means for lifting comprises termination of said pneumatic holding means prior to said lifting means.

14. Lateral registration means as defined in claim 13 in which said lifting means includes means for imparting circular motion to said conveying means to create an outward centrifugal force on said strip for lifting it from said conveying means.

15. Lateral registration means as defined in claim 13 in which said lifting means includes means for changing the pneumatic pressure of said strip on said conveying means.

16. A lateral registration means are defined in claim 12 in which said pneumatic registration control means comprises means for providing differential pressures for moving air toward said conveying means, with the pressure being greatest adjacent to said lateral registration shoulder.

17. Lateral registration means as defined in claim 16 further comprising a plurality of blowing air ports laterally positioned across said conveying means, and the blowing air port adjacent to said lateral registration shoulder having a primary intensity.

18. Lateral registration means as defined in claim 17 in which the lateral registration means comprises a more forceful blowing air port located closest to said shoulder and being located as a first blowing port to engage the leading corner of said strip adjacent to said shoulder.

References Cited

UNITED STATES PATENTS

| | | | |
|---|---|---|---|
| 2,866,637 | 12/1958 | Pendleton | 226—95 |
| 3,227,348 | 1/1966 | Jenkins | 226—196 |
| 3,268,222 | 8/1966 | Off | 271—74 |

M. HENSON WOOD, Jr., *Primary Examiner.*

RICHARD A. SCHACHER, *Assistant Examiner.*

U.S. Cl. X.R.

226—196